(12) United States Patent
Lo et al.

(10) Patent No.: US 9,141,735 B2
(45) Date of Patent: Sep. 22, 2015

(54) CIRCUIT DEVICE RELIABILITY SIMULATION SYSTEM

(75) Inventors: Jia-Lin Lo, Zhongli (TW); Ke-Wei Su, Zhubei (TW); Min-Chie Jeng, Keelung (TW); Feng-Ling Hsiao, Xinying (TW); Cheng Hsiao, Hsinchu (TW); Yi-Shun Huang, Hsinchu (TW); Yi-Chun Chen, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 563 days.

(21) Appl. No.: 12/818,655

(22) Filed: Jun. 18, 2010

(65) Prior Publication Data

US 2011/0313735 A1    Dec. 22, 2011

(51) Int. Cl.
*G06F 17/50* (2006.01)
*G01R 31/26* (2014.01)

(52) U.S. Cl.
CPC ........ G06F 17/5036 (2013.01); *G01R 31/2642* (2013.01); *G01R 31/2648* (2013.01); *G06F 2217/76* (2013.01); *G06F 2217/82* (2013.01)

(58) Field of Classification Search
CPC ............ G01R 31/2642; G01R 31/2848; G06F 2217/76
USPC .......................................................... 703/14
See application file for complete search history.

(56) References Cited

U.S. PATENT DOCUMENTS

| | | | | |
|---|---|---|---|---|
| 5,615,377 A * | 3/1997 | Shimizu et al. | ................. | 703/13 |
| 5,822,218 A * | 10/1998 | Moosa et al. | .................... | 716/52 |
| 6,278,964 B1 * | 8/2001 | Fang et al. | ...................... | 703/19 |
| 6,524,872 B1 * | 2/2003 | Cheung | ........................... | 438/17 |
| 6,795,802 B2 * | 9/2004 | Yonezawa et al. | .............. | 703/14 |
| 7,039,566 B2 * | 5/2006 | Koike | ................................. | 703/2 |
| 7,219,045 B1 * | 5/2007 | Wu et al. | .......................... | 703/14 |
| 7,268,575 B1 * | 9/2007 | Chen et al. | ................ | 324/762.09 |
| 7,292,955 B2 * | 11/2007 | Asano et al. | ................... | 702/118 |
| 7,292,968 B2 * | 11/2007 | Wu et al. | ......................... | 703/13 |
| 7,567,891 B1 * | 7/2009 | Liu et al. | .......................... | 703/13 |
| 7,820,457 B2 * | 10/2010 | Chen et al. | ....................... | 438/14 |
| 8,099,269 B2 * | 1/2012 | Topaloglu et al. | .............. | 703/14 |
| 8,106,461 B2 * | 1/2012 | Chen et al. | .................... | 257/355 |

(Continued)

FOREIGN PATENT DOCUMENTS

CN           101587162       11/2009

OTHER PUBLICATIONS

Chinese Patent Office, Office Action dated Aug. 16, 2012, Application No. 201010563371.2, 8 pages.

(Continued)

*Primary Examiner* — Akash Saxena
(74) *Attorney, Agent, or Firm* — Haynes and Boone, LLP (57) ABSTRACT

The present disclosure provides systems for predicting semiconductor reliability. In an embodiment a method for predicting the semiconductor reliability includes receiving a degradation parameter input of a semiconductor device and using a degradation equation to determine a plurality of bias dependent slope values for degradation over a short time period according to the degradation parameter input. The plurality of slope values include at least two different slope values for degradation over time. The system accumulates the plurality of slope values and projects the accumulated slope values over a long time period to determine a stress effect for the semiconductor device.

14 Claims, 9 Drawing Sheets

(56) References Cited

U.S. PATENT DOCUMENTS

| | | | |
|---|---|---|---|
| 8,271,254 B2* | 9/2012 | Kinoshita et al. | 703/14 |
| 8,285,524 B2* | 10/2012 | Namba et al. | 703/14 |
| 2002/0008252 A1* | 1/2002 | Koike | 257/200 |
| 2002/0022949 A1* | 2/2002 | Yonezawa et al. | 703/14 |
| 2003/0055621 A1* | 3/2003 | Wu et al. | 703/14 |
| 2003/0189465 A1* | 10/2003 | Abadeer et al. | 331/57 |
| 2003/0195728 A1* | 10/2003 | Koike | 703/2 |
| 2007/0238200 A1* | 10/2007 | Chen et al. | 438/7 |
| 2008/0027699 A1* | 1/2008 | Wu et al. | 703/14 |
| 2008/0027700 A1* | 1/2008 | Kinoshita et al. | 703/14 |
| 2008/0126064 A1* | 5/2008 | Tseng et al. | 703/14 |
| 2009/0082978 A1* | 3/2009 | Yang et al. | 702/58 |
| 2009/0094013 A1* | 4/2009 | Topaloglu et al. | 703/14 |
| 2009/0299716 A1* | 12/2009 | Liu et al. | 703/13 |
| 2010/0076741 A1* | 3/2010 | Takeuchi | 703/14 |
| 2010/0250223 A1* | 9/2010 | Hagishima et al. | 703/14 |
| 2011/0010117 A1* | 1/2011 | Chen et al. | 702/58 |
| 2011/0257954 A1* | 10/2011 | Soni et al. | 703/14 |
| 2011/0313735 A1* | 12/2011 | Lo et al. | 703/2 |

OTHER PUBLICATIONS

Robert H. Tu, Elyse Rosenbaum, Wilson Y. Chan, Chester C. Li, Eric Minami, Khandker Quader, Ping Keung Ko and Chenming Hu; "Berkeley Reliability Tools—BERT;" Oct. 1993; pp. 1524-1534; IEEE Transactions on Computer-Aided Design of Integrated Circuits and Systems; vol. 12; No. 10; IEEE Xplore.

Zhihong Liu, Weiquan Zhang and Fuchen Mu; "Build-In Reliability for Circuit Design in the Nanometer Technology Era;" 2004; pp. 205-210; IEEE International Conference on Integrated Circuit Design and Technology; IEEE Xplore.

\* cited by examiner

CIRCUIT DEVICE RELIABILITY SIMULATION SYSTEM

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed. In the course of integrated circuit evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling-down also produces a relatively high power dissipation value, which may be addressed by using low power dissipation devices such as complementary metal-oxide-semiconductor (CMOS) devices.

It is generally understood that circuit devices, such as NMOS or PMOS transistors degrade with use over time. As an example of degradation, leakage may increase and/or mobility may decrease as the device is used over time. This problem is multiplied as device size is further reduced. To determine a useful life for the device, designers often use a device model simulator, such as the well known SPICE computer simulation system to input varying parameters for the device. After running the simulation of the proposed device, the designers may use the outputted information from the simulation and modify parameters to improve upon the device where needed.

The traditional simulation systems assume the degradation indexes can be mapped as an age factor. A circuit device's age is generally a linear function of stress time. The simulation age of the device ($\Delta$Age) increases during operation of the circuit. Age duration is traditionally calculated from a direct integral of the age. For example, traditional age calculations may be as follows:

$$D = (Age)^n, Age = Age(t), n = const$$

$$\Delta Age = \int_0^{tran\_time} Age(t) dt$$

$$Age_{new} = Age_{old} + \Delta Age \cdot \frac{dagetime}{tran\_time}$$

$$D_{new} = (Age_{new})^n$$

Where D is the degradation of the device and where this traditional system assumes that D vs. time has a constant slope (n). Thus, the system extrapolates dt(tran_time) to T to predict a stress effect for the device. Given that the age is a linear function of stress time, the estimated age after a given long stress time may be obtained by direct linear extrapolation. In other words, contemporary simulation systems use an age constant (constant n) and extrapolate a value to predict a stress effect on the device being simulated. As such, n is assumed as being constant and independent of the bias condition of the device. Thus, this type of system incorrectly simulates bias dependant conditions of aging for circuit devices.

Thus, it is desirable to have a circuit device reliability simulation system addressing one or more of the issues discussed above by having an improved system to predict device reliability.

SUMMARY

The present disclosure provides systems for predicting semiconductor reliability. In an embodiment a method for predicting the semiconductor reliability includes receiving a degradation parameter input of a semiconductor device and using a degradation equation to determine a plurality of bias dependent slope values for degradation over a short time period according to the degradation parameter input. The plurality of slope values include at least two different slope values for degradation over time. The system accumulates the plurality of slope values and projects the accumulated slope values over a long time period to determine a stress effect for the semiconductor device.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the invention. Specific examples of components and arrangements are described below to simplify the present disclosure. These are, of course, merely examples and are not intended to be limiting.

It circuit devices, such as field-effect transistors (FETs), NMOS or PMOS transistors, and the like degrade with use over time. As an example of degradation, leakage may increase and/or mobility may decrease as the device is used. To determine a useful life for a designed device, designers often use a device model simulator, such as a SPICE computer simulation system. Users input varying parameters for the device and let the simulation system run a series of calculations relating to the design criteria and supplied parameters. After running the simulation of the proposed device, the designers may use the outputted information from the simulation and modify parameters to improve upon the device where needed. Thus, it should be understood that embodiments of the present disclosure may be implemented as software instructions stored and processed on computer hardware. For example, the instructions may be stored on a computer readable medium.

The traditional simulation systems assume the degradation indexes can be mapped as an age factor. Since a device's age is generally a linear function of stress time, age increase (ΔAge) within a circuit operation duration with varying biases can be obtained from a direct integral of the age. Since age is a linear function of stress time, the estimated age after a given long stress time is obtained by direct linear extrapolation. In other words, contemporary simulation systems use an age constant (e.g., constant slope) and extrapolate a value to predict a stress effect on the device being simulated. As such, the slope (e.g., n) is assumed as being constant and independent of the bias condition of the device. Thus, this type of system incorrectly simulates bias dependant conditions of aging for circuit devices.

Accordingly the systems and methods of the present disclosure provide a more general method for predicting device reliability. In embodiments of the present disclosure, n relates to a slope (rise/run), or many slopes which are non-constant and are device bias dependant. Using the new device degradation (D) integrals and D projection algorithms provided herein, it is possible to obtain more generalized aging behaviors for the device being simulated where V(t) relates to a bias waveform and tran_time. This is especially the case when the devices slope n and their correlations are bias-dependant. In other words, using the D projection algorithms provided herein, the predicted degradation of the device is more accurate than the traditional simulation models.

In semiconductor devices, different stress conditions provide different degradation of the device. Therefore, the embodiments of the present disclosure, avoid the assumption of age factor integral during circuit operation duration, but instead directly accumulate degradation (D) of electric parameters using an algorithm (e.g., $\Delta D_i = \Delta D_i(g, V_i, \Delta t_i)$, as is described in more detail below. A piecewise algorithm is applied to calculate an effective slope ($n_{\textit{eff}}$) and can thus avoid traditional linear extrapolation predictions of degradation. As such, the present disclosure calculates circuit device reliability by providing systems for 1) performing a ΔD integral process and 2) using the data obtained in the ΔD integral process to perform a D-projection process.

The data calculated from these systems provide for forming a piecewise slope of a degradation line of device degradation versus time that is used to extrapolate device degradation/reliability. The ΔD integral process determines a slope for many points on a degradation chart and the D-projection process decides which points are best applied for extrapolating the predicted device degradation. As should be understood, this type prediction is more accurate than previous systems.

Figure 1:
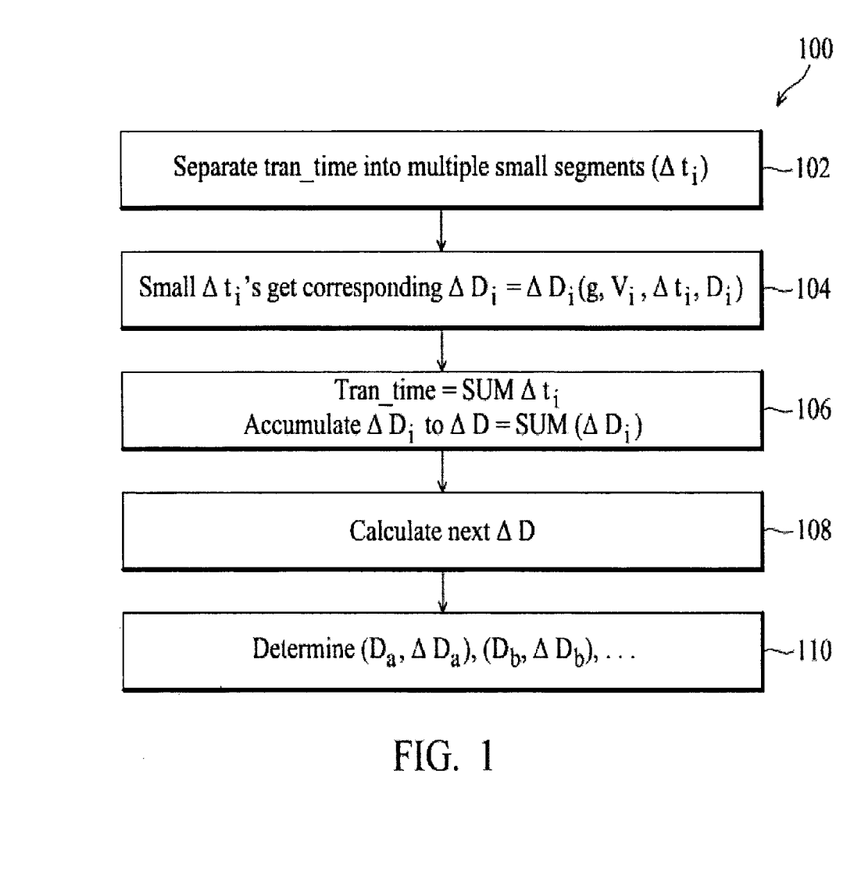
FIG. 1 illustrates a flow chart of an embodiment of a method of determining a $\Delta$D integral (device parameter slopes for short time degradation) to use in simulating a semiconductor device degradation over time according to the present disclosure.

FIG. 1 illustrates a flow chart of an embodiment of a method 100 for determining a ΔD integral where the ΔD integral relates to a plurality of device parameter degradation slopes for short time degradation periods. The method 100 is also described with respect to FIGS. 2-4. This data is used in simulating a semiconductor device degradation over time. Short time degradation is generally meant to relate to semiconductor device degradation over a time period in the range of seconds or even microseconds. In an embodiment, the method 100 uses the equation $$\Delta D_i = \Delta D_i(g, V_i, \Delta t_i)$$

This may also be expressed as $$\Delta D_i = \Delta D_i(g, V_i, \Delta t_i, D_i)$$

where ΔD is an electric parameter. For example, $\Delta D_i$ may represent a percent of change in current for the device, a voltage of the device, or a variety of degradation parameters for the device; g is a user defined degradation equation that represents the degradation for the semiconductor device; $V_i$ is in volts; and $\Delta t_i$ is in seconds. The degradation equation may be presented as $$g = g(V,t)$$

where V is in volts and t is in seconds. A device transition time is calculated using the equation $$\text{tran\_time} = \Sigma \Delta t_i,$$

ΔD is found using equation $$\Delta D = \Sigma \Delta D_i$$

and the degradation parameters are evaluated using $$(D_a, \Delta D_a), (D_b, \Delta D_b), \ldots$$

where, for example, $D_a$ has value of approximately 10 mV and $D_b$ has a value of approximately 40 mV. However, it is contemplated that other values may be used for the present disclosure.

Figure 2:
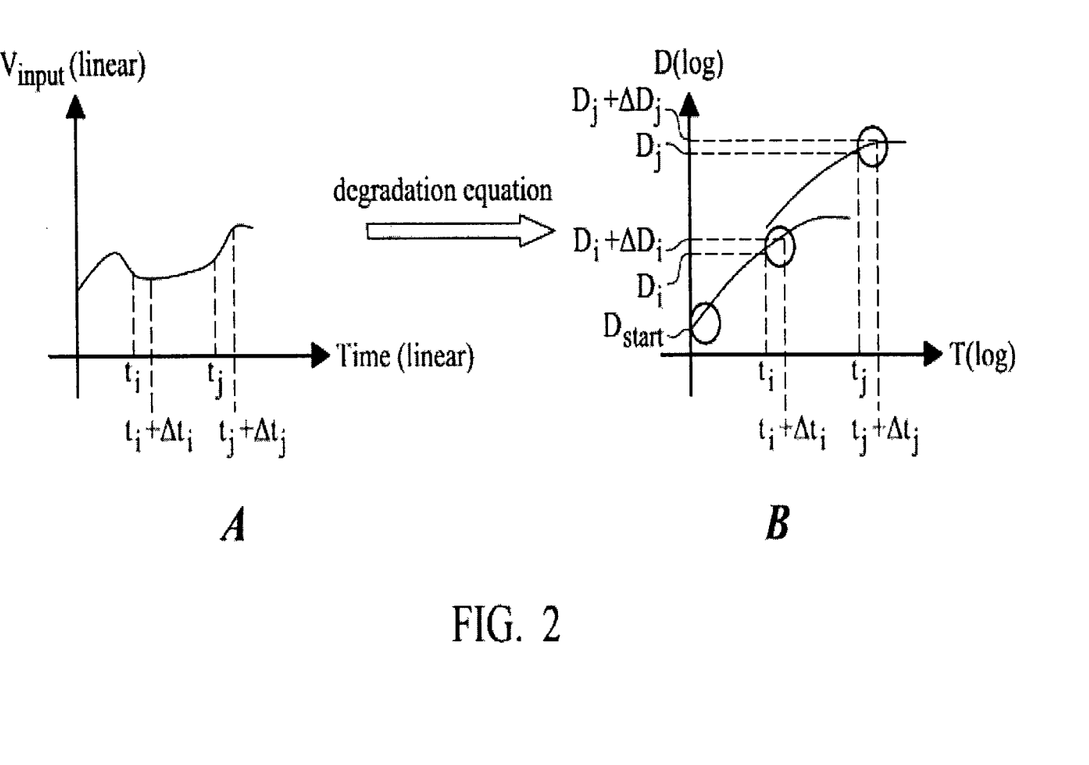
FIG. 2 illustrates an embodiment of a pair of graphs using a degradation equation according to the method of FIG. 1.

FIG. 2 illustrates an embodiment of a pair of graphs using the degradation equation according to the method of FIG. 1. Chart A shows a graph of a linear voltage input to the semiconductor device versus linear time. This graph A allows us to obtain $t_i, t_i + \Delta t_i, t_j, t_j + \Delta t_j \ldots$. This information is ran through the degradation equation to provide the chart B, showing degradation D(log) versus time T(log). This graph B provides a plurality of slopes, for example, at the curve segments from $D_i, t_i,$ to $D_i + \Delta D_i, t_i + \Delta t_i,$ and so on. This is expressed in block 102 of method 100. In other words, the method 100 separates a device transitional time (tran_time) into multiple small segments ($\Delta t_i$). According to block 104, of method 100, Small Δti's get corresponding $\Delta D_i = \Delta D_i(g, V_i, \Delta t_i, D_i)$.

$D_{\textit{start}}$ is a unique case of D, when t=0 sec. $D_{\textit{start}}$ is determined from previous run, where $D_{\textit{start}} = 0$ for first run. ΔD may be expressed as follows:

for $D_{\textit{start}} = 0$ $$\Delta D = \sum_i \left( A(V_{gs,1}, V_{ds,i}) \cdot n(V_{gs,1}, V_{ds,i}) \cdot t_i^{n(V_{gs,i}, V_{ds,i})-1} \cdot \Delta t_i \right)$$

for $D_{\textit{start}} > 0$ $$\Delta D = \sum_i \left( n(V_{gs,i}, V_{ds,i}) \cdot A(V_{gs}, V_{ds})^{\frac{1}{n(V_{gs}, V_{ds})}} \cdot D_{\textit{start}}^{1-\frac{1}{n(V_{gs}, V_{ds})}} \cdot \Delta t_i \right)$$

Figure 3:
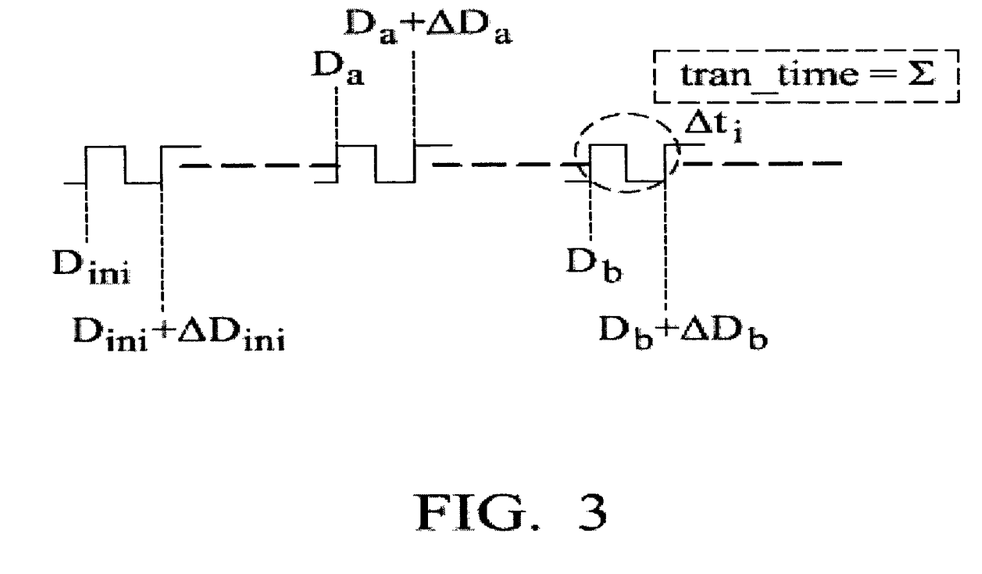
FIG. 3 illustrates an embodiment of a graph showing separating transition time into segments ($\Delta t_i$) according to the method of FIG. 1.
Figure 4:
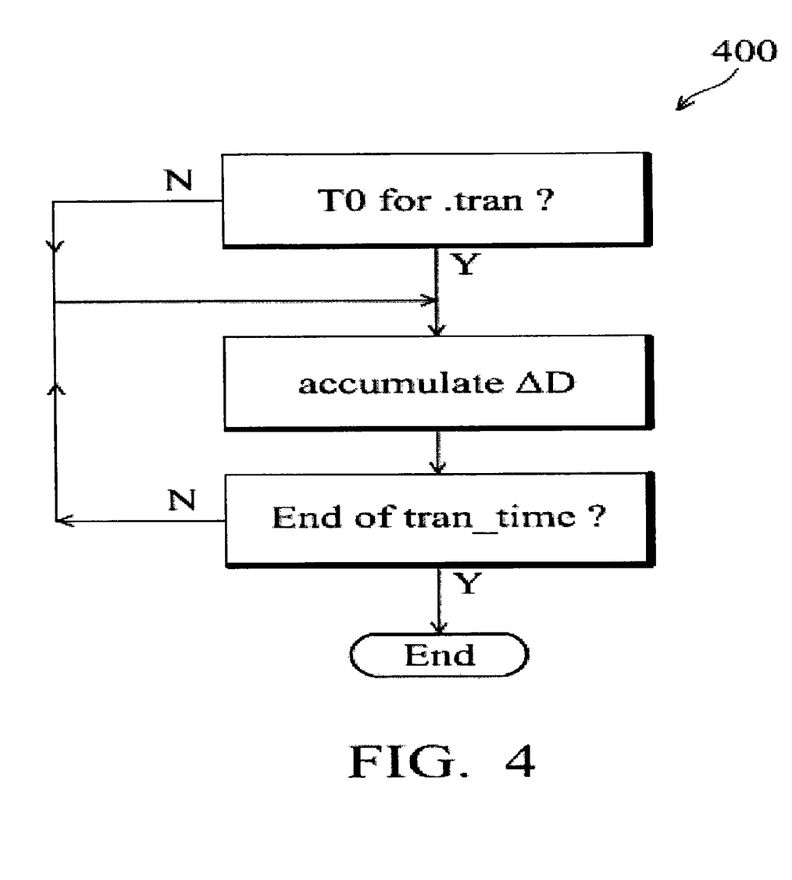
FIG. 4 illustrates a flow chart of an embodiment of a method for accumulating $\Delta$D according to the method of FIG. 1.

At block 106, the method 100 provides that tran_time=SUM $\Delta t_i$ and the method 100 accumulates $\Delta D_i$ to ΔD=SUM ($\Delta D_i$) according to the graph of FIG. 3 and the chart 400 of FIG. 4. In essence, the method 100 calculates the next AD at block 108 and determines $(D_a, \Delta D_a), (D_b, \Delta D_b), \ldots$ at block 110.

Figure 5:
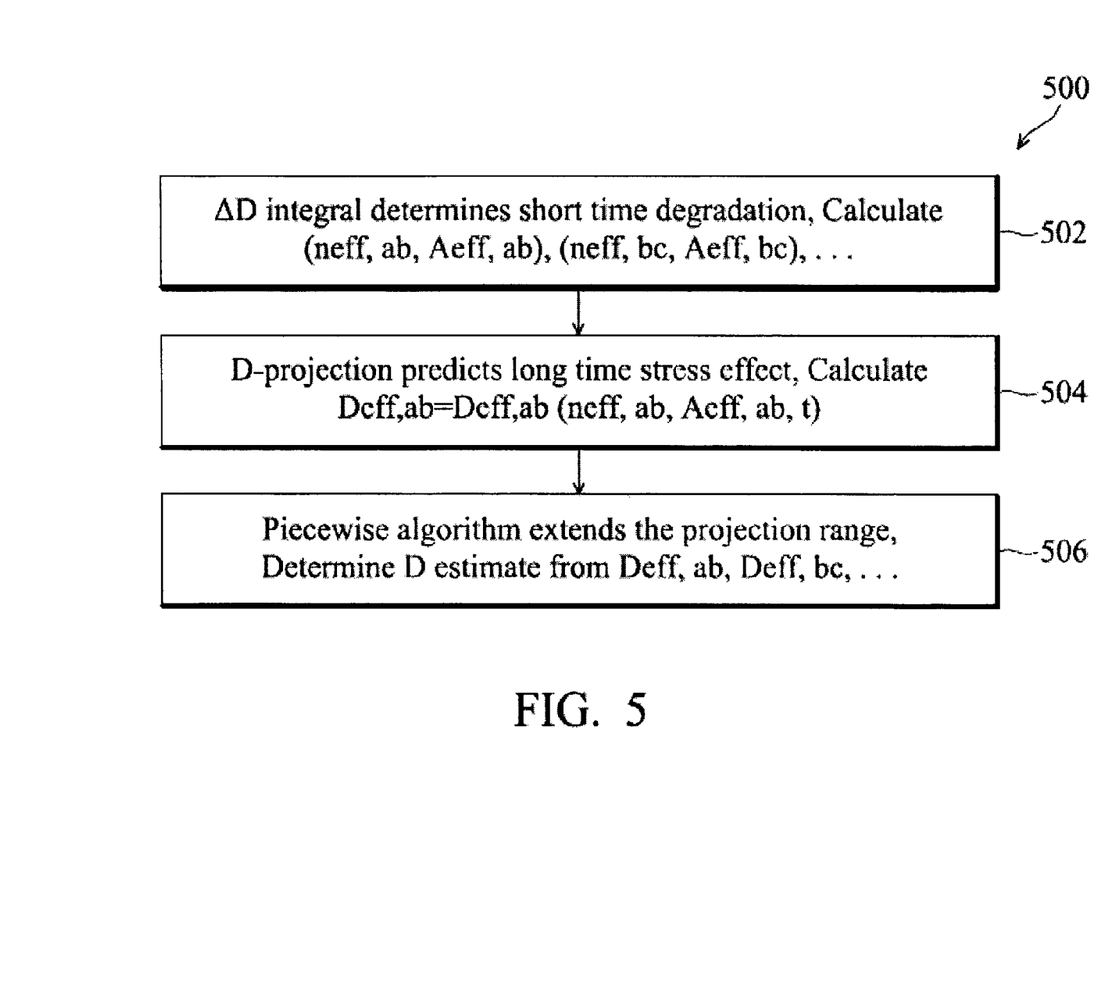
FIG. 5 illustrates a flow chart of an embodiment of a method of determining a D-projection (device parameter for long time stress effect) to use in simulating a semiconductor device degradation over time according to the present disclosure.

The next part of this disclosure provides for using the data obtained above in the ΔD integral process to perform a D-projection process. FIG. 5 illustrates a flow chart of an embodiment of a method 500 for determining a D-projection (device parameter for long time stress effect) to use in simulating a semiconductor device degradation over time according to the present disclosure. The method 500 is discussed herein with reference to FIGS. 6-9. In short, the method 500 uses the data from method 100 described above which performs a ΔD integral to determine short time (e.g., on the order of seconds) degradation and calculates ($n_{eff,ab}$, $A_{eff,ab}$), ($n_{eff,bc}$, $A_{eff,bc}$) ... at block 502. Device designers need to use this information to predict a stress effect for the device over a long term (e.g., on the order of years). This long term stress prediction may be accomplished by a D-projection, as is performed by method 500 in block 504 and seen in FIG. 6. At block 504, the method 500 also performs calculations using the formula $$D_{eff,ab} = D_{eff,ab}(n_{eff,ab}A_{eff,ab}, t) \ldots \text{ where}$$

$$D_{eff} = \left((D_{ini} + \Delta D_{ini})^{\frac{1}{n_{eff}}} + A_{eff} \cdot t\right)^{n_{eff}}$$

Figure 8:
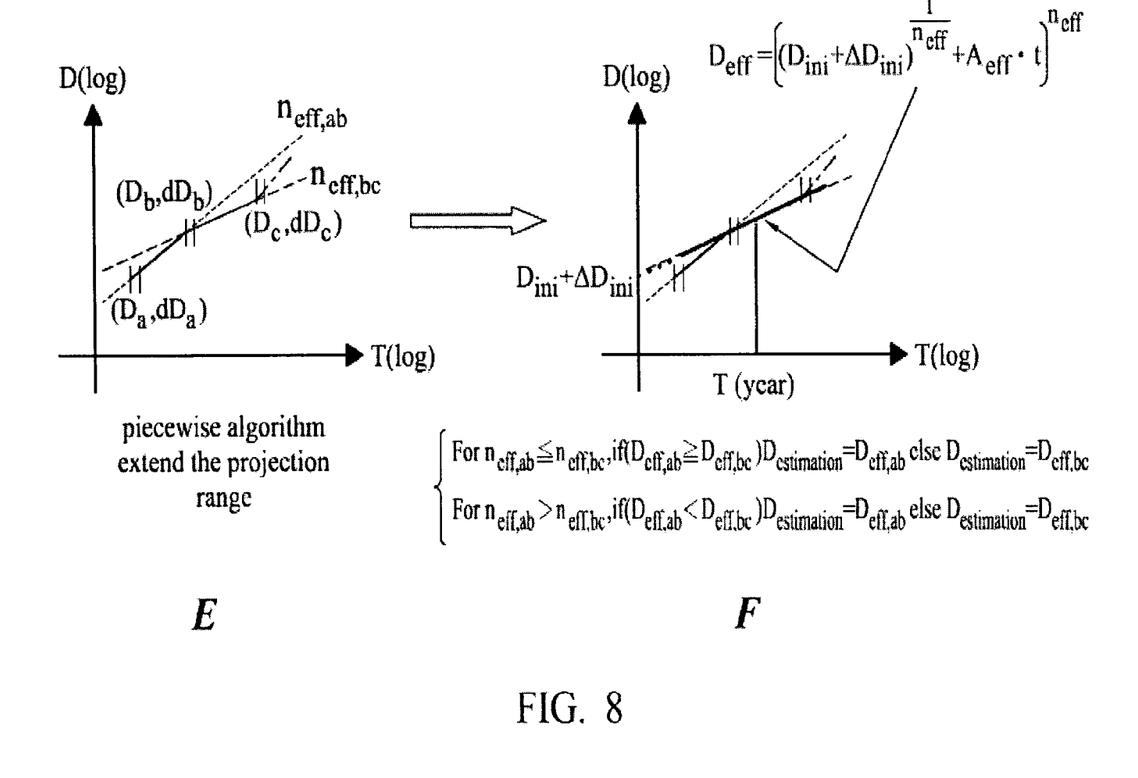
FIG. 8 illustrates of a pair of graphs showing a derived degradation projection according to the method of FIG. 5.

The method 500 then proceeds to block 506 where the method 500 uses a piecewise algorithm to extend the projection range and determine a D (degradation) estimate from $D_{eff}$, ab, $D_{eff}$, bc, ..., as can be seen in FIG. 8.

Figure 6:
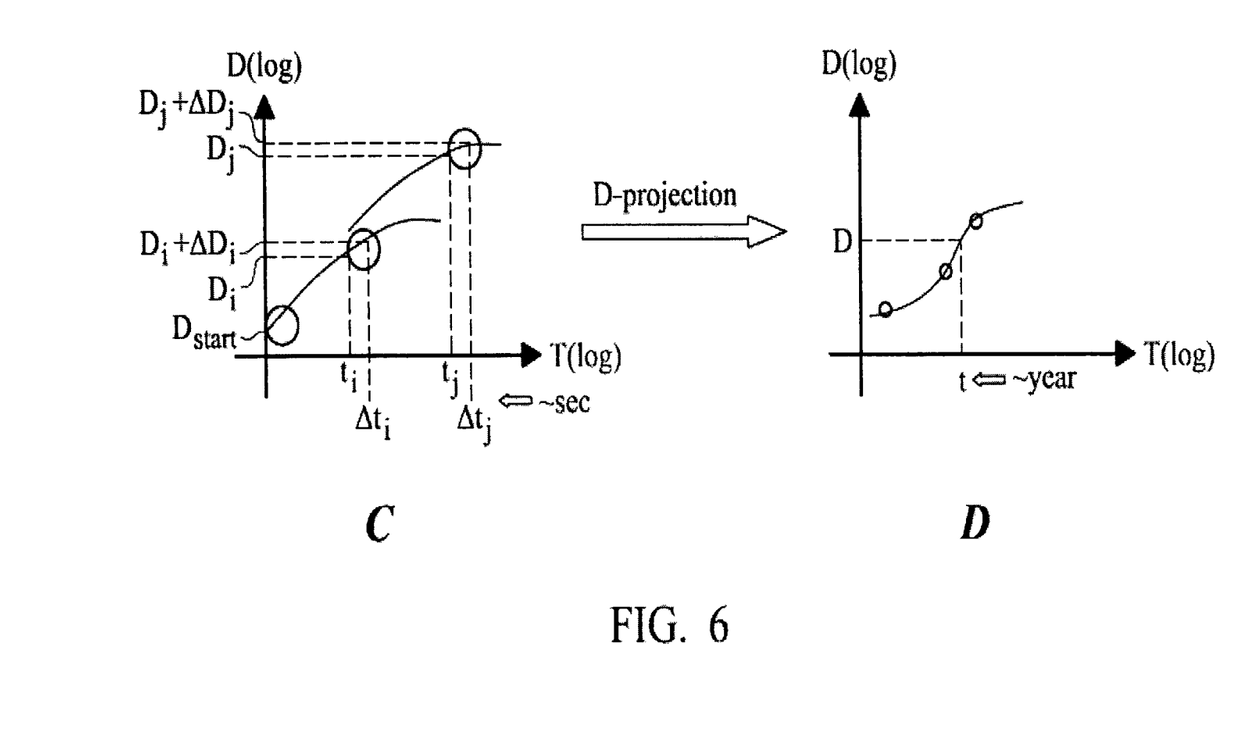
FIG. 6 illustrates an embodiment of a pair of graphs showing a D-projection according to the method of FIG. 5.

More specifically, FIG. 6 illustrates an embodiment of a pair of graphs C and D showing a D-projection according to the method of FIG. 5. Graph C illustrates the graph B, showing degradation D(log) versus time T(log). This graph B provides a plurality of slopes much like that shown in graph B of FIG. 2. For example, one slope is found at the curve segment from $D_i$, $t_i$, to $D_i + \Delta D_i$, $\Delta t_i$, and so on. Using this, the D-projection yields the data in chart D per block 504 of method 500, which predicts the long time (e.g., ~in terms of years) stress effect for the device. Using this, the data from the graph of FIG. 3 yields the graph of FIG. 7 where an estimated $$D_{eff} \approx (A_{eff} \cdot t)^{n_{eff}}$$

Figure 7:
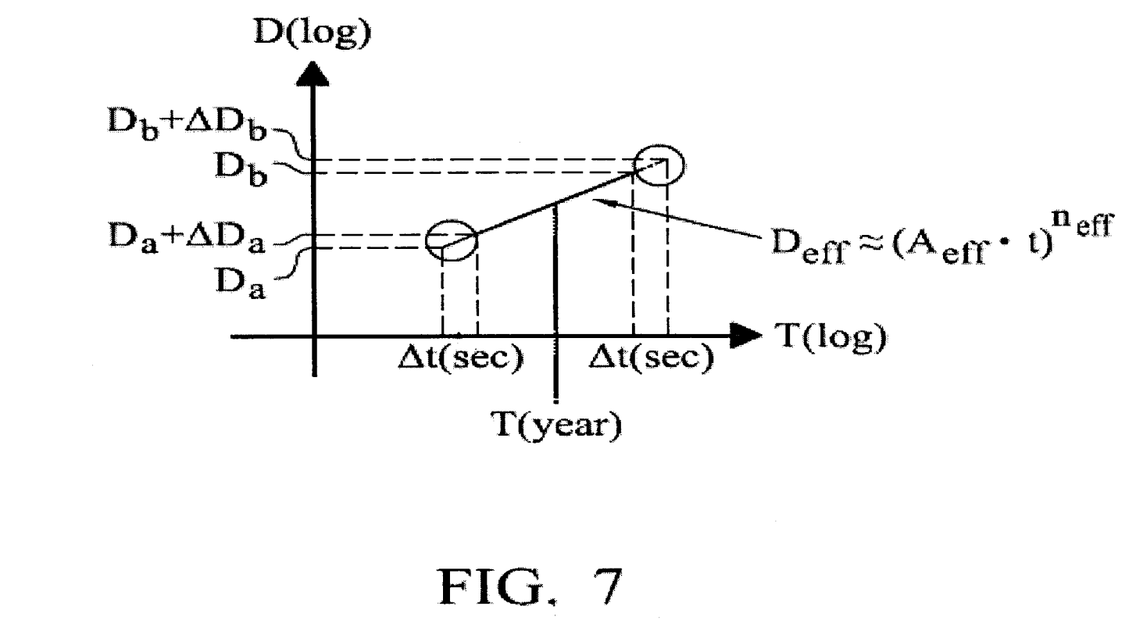
FIG. 7 illustrates an embodiment of a graph showing an estimated $D_{eff}$ according to the method of FIG. 5.

In an embodiment, $D_a$ and $D_b$ are defined by users or by the simulation software system. For example, $D_a$ may be approximately 10 mV and $D_j$ may be approximately 40 mV. $\Delta D_a$ and $\Delta D_b$ are determined from the ΔD integral of method 100.

$A_{eff}$ and $n_{eff}$ are derived from ($D_a$, $\Delta D_a$, $D_b$, $\Delta D_b$, $\Delta t$) according to the following:

$A_{eff}$ and $n_{eff}$ Derivation:

$$D \approx (A_{eff} \cdot t)^{n_{eff}} \Rightarrow \frac{dD}{dt} \approx n_{eff} \cdot A_{eff} \cdot (A_{eff} \cdot t)^{n_{eff}-1} = n_{eff} \cdot A_{eff} \cdot D^{1-\frac{1}{n_{eff}}}$$

$$\Rightarrow \begin{cases} DR_a, \Delta DR_a, \Delta T \Rightarrow \frac{\Delta DR_a}{\Delta T} \approx n_{eff} \cdot A_{eff} \cdot DR_a^{1-\frac{1}{n_{eff}}} \\ DR_b, \Delta DR_b, \Delta T \Rightarrow \frac{\Delta DR_b}{\Delta T} \approx n_{eff} \cdot A_{eff} \cdot DR_b^{1-\frac{1}{n_{eff}}} \end{cases}$$

$$\therefore \frac{\Delta DR_a}{\Delta DR_b} \approx \left(\frac{DR_a}{DR_b}\right)^{1-\frac{1}{n_{eff}}} \Rightarrow$$

$$\ln(\Delta DR_a) - \ln(\Delta DR_b) \approx \left(1 - \frac{1}{n_{eff}}\right) \cdot [\ln(DR_a) - \ln(DR_b)]$$

$$\Rightarrow \boxed{n_{eff} \approx \left(1 - \frac{\ln(\Delta DR_a) - \ln(\Delta DR_b)}{\ln(DR_a) - \ln(DR_b)}\right)^{-1}, A_{eff} \approx \frac{\Delta DR_a}{\Delta T \cdot n_{eff} \cdot DR_a^{1-\frac{1}{n_{eff}}}}}$$

$$\Rightarrow D_{eff,simple} \approx (A_{eff} \cdot t)^{n_{eff}} \text{ or more}$$

accurately $D_{eff} \cong \left(A_{eff} \cdot t + (D_{ini} + \Delta D_{ini})^{\frac{1}{n_{eff}}}\right)^{n_{eff}}$ $$\Leftrightarrow D_{estimation} \cong \left(A_{eff} \cdot m \cdot \Delta T + (D_{ini} + \Delta D_{ini})^{\frac{1}{n_{eff}}}\right)^{n_{eff}}$$

(estimation after $m$ cycles considering $D_{ini}$)

In addition, the following equations may be used:

$$n_{eff,h,k} = \left(1 - \frac{\ln(\Delta DR_{h,k}) - \ln(\Delta DR_{h,k-1})}{\ln(DR_{h,k}) - \ln(DR_{h,k-1})}\right)^{-1},$$

$$A_{eff,h,k} = \frac{\Delta DR_{h,k-1}}{\Delta T \cdot n_{eff,h,k} \cdot DR_{h,k-1}^{1-\frac{1}{n_{eff,h,k}}}}$$

$$DR_{h,0} \equiv Di_h, \Delta DR_{h,0} \equiv \Delta Di_h$$

to calculate (neff,ab, Aeff,ab), (neff,bc, Aeff,bc) ... in the D-projection process provided herein.

Figure 9:
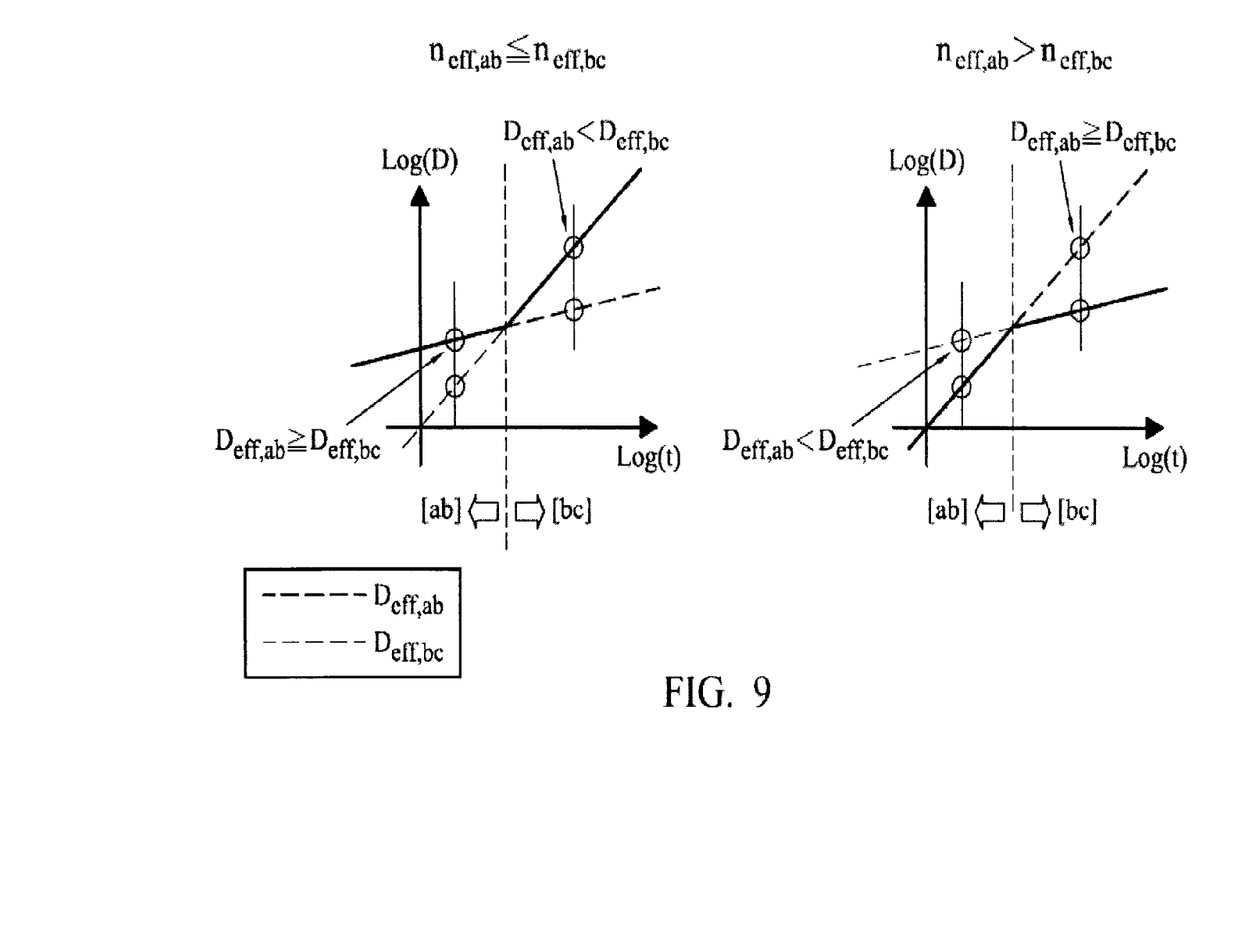
FIG. 9 illustrates an embodiment of a pair of graphs showing $D_{eff,ab}$ and $D_{eff,bc}$ according to the method of FIG. 5.

FIG. 8 illustrates of a pair of graphs E and F showing a derived degradation projection according to the method of FIG. 5 using a piecewise algorithm as in block 506 of method 500 to extend the projection range of the degradation where $$D_{eff} = \left((D_{ini} + \Delta D_{ini})^{\frac{1}{n_{eff}}} + A_{eff} \cdot t\right)^{n_{eff}}$$

using $$\begin{cases} \text{For } n_{eff,ab} \leq n_{eff,bc}, \\ \text{if } (D_{eff,ab} \geq D_{eff,bc}) \ D_{estimation} = D_{eff,ab} \text{ else } D_{estimation} = D_{eff,bc}. \\ \text{For } n_{eff,ab} > n_{eff,bc}, \\ \text{if } (D_{eff,ab} < D_{eff,bc}) \ D_{estimation} = D_{eff,ab} \text{ else } D_{estimation} = D_{eff,bc}. \end{cases}$$

to determine $D_{estimate}$ from $D_{eff,ab}$, $D_{eff,bc}$, .... FIG. 9 illustrates an embodiment of a pair of graphs showing $D_{eff,ab}$ and $D_{eff,bc}$ according to the present disclosure.

In summary, the methods and devices disclosed herein provide a circuid device reliability simulation system. In doing so, the present disclosure offers several advantages over prior art devices. It is understood that different embodiments disclosed herein offer different disclosure, and that they may make various changes, substitutions and alterations herein without departing from the spirit and scope of the present disclosure.

What is claimed is:

1. A method of predicting semiconductor reliability, the method comprising:
   receiving into a simulation calculation device a degradation electrical parameter input of a semiconductor device, the semiconductor device having a device transitional time associated with the degradation electrical parameter, wherein the device transitional time is the time for the semiconductor device to transition from a high voltage state to a low voltage state or from a low voltage state to a high voltage state;

separating the device transitional time of the semiconductor device into first and second small segments ($\Delta t_i$);

calculating, using a degradation equation, first and second bias dependent slope values for the first small segment, wherein the first and second bias dependent slope values are calculated using different initial values of the degradation electrical parameter;

calculating, using the degradation equation, third and fourth bias dependent slope values for the second small segment, wherein the third and fourth bias dependent slope values are calculated using different initial values of the degradation electrical parameter;

accumulating the first and second bias dependent slope values into a first accumulated slope value;

accumulating the third and fourth bias dependent slope values into a second accumulated slope value;

projecting the first and second accumulated slope values over a long term projection range to determine a stress effect for the semiconductor device; and extending the projection range by applying a piecewise algorithm to calculate an effective slope of a degradation line representing device reliability.

2. The method of claim 1, wherein the long term projection range is in a range of years.

3. The method of claim 1, wherein the degradation electrical parameter relates to a percentage change in current for the semiconductor device.

4. The method of claim 1, wherein the degradation electrical parameter relates to a threshold voltage for the semiconductor device.

5. The method of claim 1, wherein degradation electrical parameter input relates to a field-effect transistor (FET) device.

6. A non-transitory machine-readable storage medium encoded with a computer program that, when executed, performs the steps of:

receiving a degradation electrical parameter input relating to a threshold voltage bias of a semiconductor device, the semiconductor device having a device transitional time associated with the degradation electrical parameter, wherein the device transitional time is the time for the semiconductor device to transition from a high voltage state to a low voltage state or from a low voltage state to a high voltage state;

separating the device transitional time of the semiconductor device into first and second small segments ($\Delta t_i$);

calculating, using a degradation equation, first and second bias dependent slope values for the first small segment, wherein the first and second bias dependent slope values are calculated using different initial values of the degradation electrical parameter;

calculating, using the degradation equation, third and fourth bias dependent slope values for the second small segment, wherein the third and fourth bias dependent slope values are calculated using different initial values of the degradation electrical parameter;

accumulating the first and second bias dependent slope values into a first accumulated slope value;

accumulating the third and fourth bias dependent slope values into a second accumulated slope value;

projecting the first and second accumulated slope values over a long term projection range to determine a stress effect for the semiconductor device; and extending the projection range by applying a piecewise algorithm to calculate an effective slope of a degradation line representing device reliability.

7. The non-transitory machine-readable storage medium of claim 6, wherein the long term projection range is in a range of years.

8. The non-transitory machine-readable storage medium of claim 6, wherein the degradation electrical parameter relates to a percentage change in current for the semiconductor device.

9. The non-transitory machine-readable storage medium of claim 6, wherein the degradation electrical parameter further relates to a transition time for the semiconductor device.

10. The non-transitory machine-readable storage medium of claim 6, wherein degradation electrical parameter input relates to a field-effect transistor (FET) device.

11. A semiconductor test system for predicting semiconductor reliability over time, the system comprising:

a device model simulator configured to:

receive into a simulation calculation device a degradation electrical parameter input of a semiconductor device, wherein the degradation parameter considers an initial degradation parameter and subsequent degradation parameters, and the semiconductor device having a device transitional time associated with the degradation electrical parameter, wherein the device transitional time is the time for the semiconductor device to transition from a high voltage state to a low voltage state or from a low voltage state to a high voltage state;

separate the device transitional time of the semiconductor device into first and second small segments ($\Delta t_i$);

calculate, using a degradation equation, first and second bias dependent slope values for the first small segment, wherein the first and second bias dependent slope values are calculated using different initial values of the degradation electrical parameter;

calculate, using the degradation equation, third and fourth bias dependent slope values for the second small segment, wherein the third and fourth bias dependent slope values are calculated using different initial values of the degradation electrical parameter;

accumulate the first and second bias dependent slope values into a first accumulated slope value;

accumulate the third and fourth bias dependent slope values into a second accumulated slope value;

project the first and second accumulated slope values over a long term projection range to determine a stress effect for the semiconductor device; and extend the projection range by applying a piecewise algorithm to calculate an effective slope of a degradation line representing device reliability.

12. The test system of claim 11, wherein the long term projection range is in a range of years.

13. The test system of claim 11, wherein the degradation parameter relates to a percentage change in current for the semiconductor device.

14. The test system of claim 11, wherein the degradation electrical parameter relates to a threshold voltage for the semiconductor device.

* * * * *